(12) United States Patent  
Becker et al.

(10) Patent No.: US 8,998,329 B2  
(45) Date of Patent: Apr. 7, 2015

(54) FITTING FOR A VEHICLE SEAT

(75) Inventors: Martin Becker, Wuppertal (DE); Christoph Peters, Wermelskirchen (DE); Gregor Vossmann, Werlte (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 27 days.

(21) Appl. No.: 13/824,928

(22) PCT Filed: Aug. 26, 2011

(86) PCT No.: PCT/EP2011/004302  
§ 371 (c)(1), (2), (4) Date: Jun. 21, 2013

(87) PCT Pub. No.: WO2012/038020  
PCT Pub. Date: Mar. 29, 2012

(65) Prior Publication Data  
US 2013/0270883 A1 Oct. 17, 2013

(30) Foreign Application Priority Data  
Sep. 22, 2010 (DE) .......................... 10 2010 046 728

(51) Int. Cl.  
*B60N 2/235* (2006.01)

(52) U.S. Cl.  
CPC ..................................... *B60N 2/2356* (2013.01)

(58) Field of Classification Search  
USPC ............ 297/362, 367 L, 367 P, 367 R, 463.1  
See application file for complete search history.

(56) References Cited

U.S. PATENT DOCUMENTS

| | | | |
|---|---|---|---|
| 5,524,970 A * | 6/1996 | Kienke et al. ................. | 297/362 |
| 5,634,689 A * | 6/1997 | Putsch et al. .................. | 297/362 |
| 6,799,806 B2 | 10/2004 | Eppert et al. | |
| 7,090,299 B2 * | 8/2006 | Lange ........................... | 297/362 |
| 7,285,067 B2 * | 10/2007 | Krambeck et al. ............ | 475/162 |
| 7,461,900 B2 * | 12/2008 | Lange ....................... | 297/367 R |
| 7,513,572 B2 * | 4/2009 | Kawashima ................. | 297/362 |
| 7,607,737 B2 * | 10/2009 | Liebich et al. ............... | 297/362 |

(Continued)

FOREIGN PATENT DOCUMENTS

| | | |
|---|---|---|
| DE | 100 28 119 A1 | 1/2001 |
| DE | 103 27 922 A1 | 2/2004 |

(Continued)

OTHER PUBLICATIONS

English language translation of Office Action received in Japanese Application No. 2013-518992, dated Feb. 24, 2014.

(Continued)

*Primary Examiner* — Peter Brown  
(74) *Attorney, Agent, or Firm* — Foley & Lardner LLP

(57) ABSTRACT

A fitting for a vehicle seat has a first fitting part and a second fitting part. The fitting parts can be rotated relative to one another about an axis. A toothed ring is formed on one of the fitting parts, and guide segments for guiding bolts are formed on the other of the fitting parts. A rotatably mounted eccentric acts on the radially displaceable bolt which then interacts with the toothed ring in order to lock the fitting. A spring arrangement acts on the eccentric and is arranged in a central receptacle in the second fitting part. The second fitting part has a guide part having the guides and a cover for covering the spring arrangement, wherein the guide part and the cover are formed separately and are connected to one another.

10 Claims, 2 Drawing Sheets

(56) References Cited

U.S. PATENT DOCUMENTS

Figure 5:
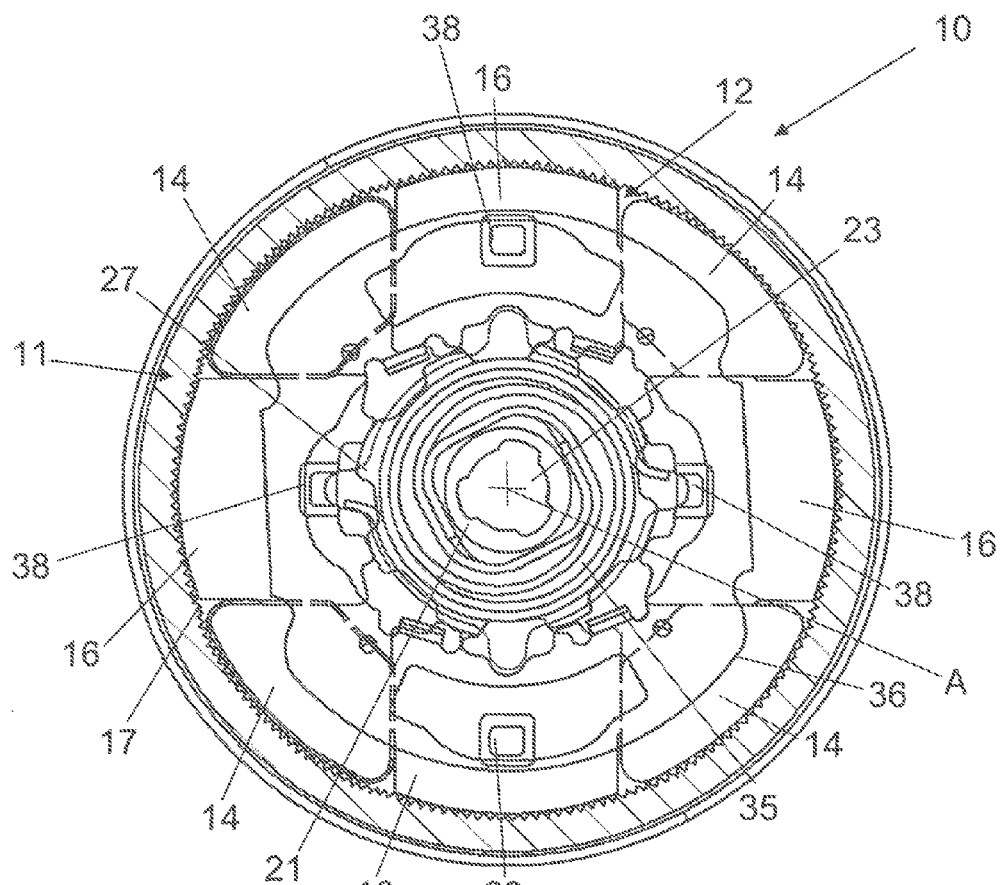

| | | | |
|---|---|---|---|
| 7,789,464 B2 * | 9/2010 | Stemmer et al. | 297/362 |
| 7,828,386 B2 * | 11/2010 | Reubeuze et al. | 297/367 P |
| 2011/0254337 A1 * | 10/2011 | Jiang et al. | 297/362 |

FOREIGN PATENT DOCUMENTS

| | | |
|---|---|---|
| DE | 103 27 922 B4 | 2/2004 |
| DE | 1020060 15 560 B3 | 8/2007 |
| DE | 2020080 08 090 U1 | 10/2008 |
| DE | 202008015 560 | 3/2009 |
| DE | 1020080 24 853 A1 | 11/2009 |
| JP | 2003-310375 A | 11/2003 |
| JP | 2005-253986 A | 9/2005 |
| JP | 2009-532142 A | 9/2009 |

OTHER PUBLICATIONS

International search report received in connection with international application No. PCT/EP2011/004302; dtd Nov. 7, 2011.

Notification of Transmittal of Translation of the International Preliminary Report on Patentability dated Apr. 4, 2013 received in International Application No. PCT/EP2011/004302.

\* cited by examiner

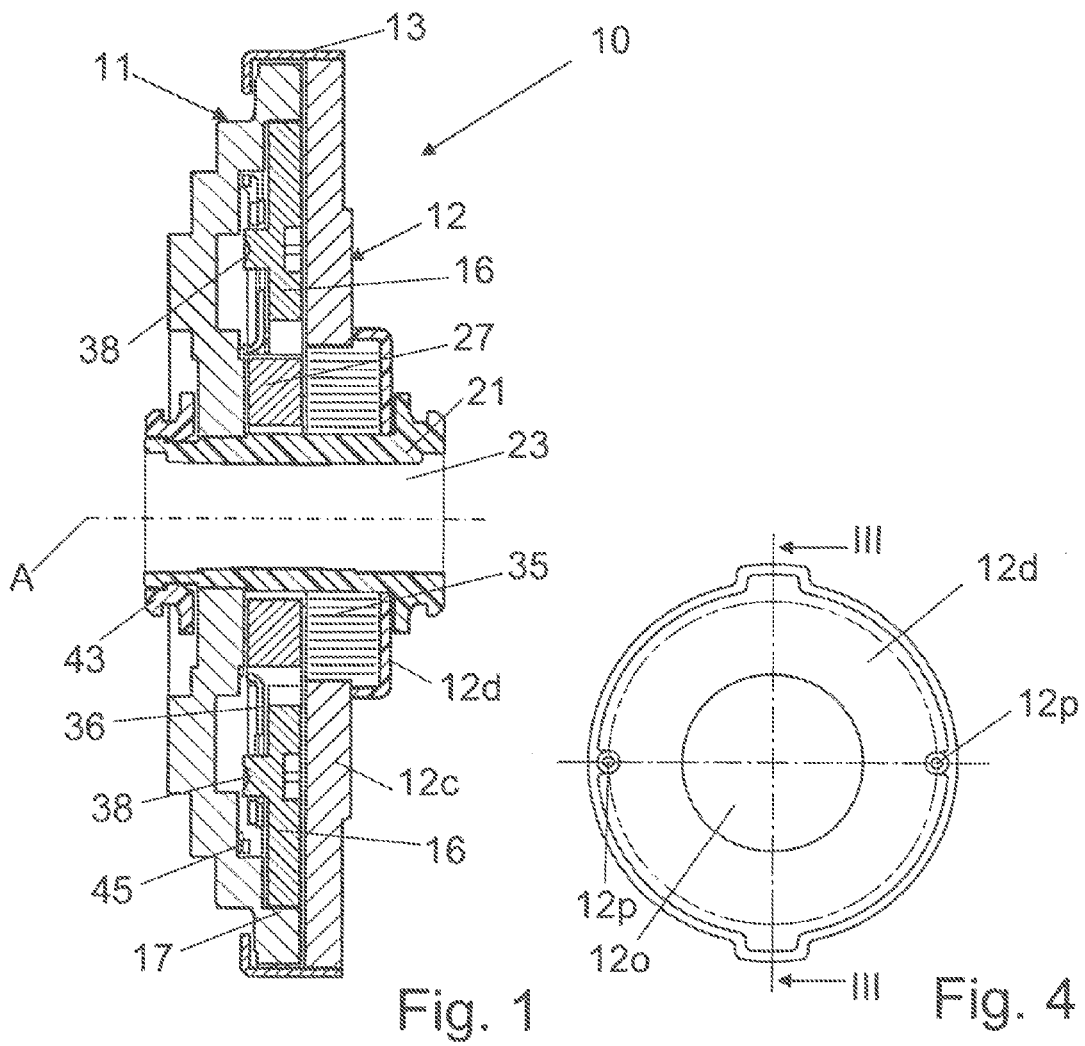
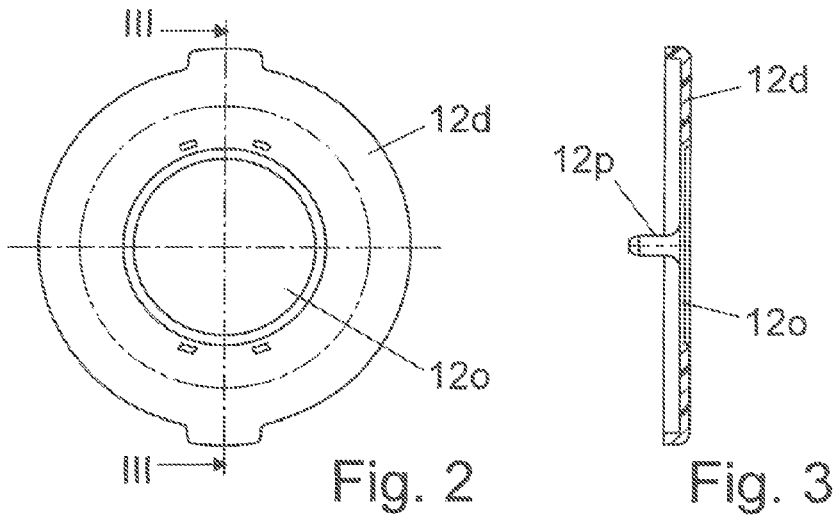

FITTING FOR A VEHICLE SEAT

CROSS REFERENCE TO RELATED APPLICATIONS

The present application is a National Stage of International Application No. PCT/EP2011/004302 filed on Aug. 26, 2011, which claims the benefit of German Patent Application No. 10 2010 046 728.6 filed on Sep. 22, 2010, the entire disclosures of which are incorporated herein by reference.

The invention relates to a fitting for a vehicle seat. with the features of the preamble of claim 1.

A fitting of this type is known from DE 100 28 119 A1. The two disk-shaped fitting parts which are rotatable relative to each other in the circumferential direction are held together axially by means of a clasping ring and are lockable to one another by means of three radially movable bolts. The bolts which lock to the first fitting part and are guided by the second fitting part are acted upon by an eccentric which, in turn, is acted upon by a spring arrangement. The spring arrangement which is designed as a spiral spring sits in a central receptacle, which is designed as a bowl-like depression, in the second fitting part.

It is proposed in DE 103 27 922 B4 to remove the base of the bowl-like depression such that the central receptacle for the spring arrangement is a through hole. This results in a smaller axial size of the fitting, but, because of the spring arrangement lying open, there is the risk of foreign bodies and of dirt penetrating and damaging the components of the fitting.

In order to cover the spring arrangement which lies open, in DE 10 2006 015 560 B3 and DE 20 2008 015 560 B3, use is made of a driver in order to rotate the eccentric, said driver interacting with a driver cover which bears flat against a second fitting part. DE 10 2008 024 853 A1 uses a driver which interacts with a welding ring and onto which a separately formed, annular, flat driver cover is pushed and is optionally connected thereto in an integrally bonded manner. The driver rotates together with the driver cover relative to the second fitting part.

The invention is based on the object of improving a fitting of the type mentioned at the beginning, in particular with regard to the weight of the fitting while simultaneously encapsulating the components against dirt. This object is achieved according to the invention by a fitting with the features of claim 1. Advantageous refinements are the subject matter of the dependent claims.

By the second fitting part being of two-part design with a guide part and a cover, a smaller material thickness and/or a lighter material can be selected for the cover, which is located outside the force flux, leading to a saving on weight by comparison to the fitting known from DE 100 28 119 A1. There is the advantage over the fitting known from DE 103 27 922 B4 that the cover encapsulates the internal components of the fitting and thereby protects said components from the penetration of foreign bodies and of dirt and damage. Furthermore, spring arrangements of differing strength and having the same diameter and with a different axial size can be accommodated by the same guide part and by different covers, i.e. a cost-effective construction kit for adapting the fitting to different axial dimensions of the spring arrangement is possible. This is not possible with the flat covering disks of the drivers. The material thickness of the cover can be smaller than the material thickness of the guide part of the second fitting part, and therefore smaller dimensions in comparison to the known, single-part, second fitting part with the bowl-like depression are also possible.

In order to act upon the eccentric counter to the prestressing of the spring arrangement so as to unlock the fitting, a (manually) rotatable driver is preferably provided. The cover provided according to the invention can serve not only as an axial contact surface of the driver, but said cover may also support the driver rotatably, i.e. the driver rotates in the cover relative thereto.

Figure 6:
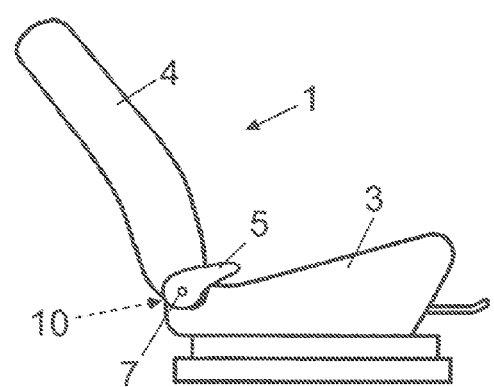

The invention is explained in more detail below with reference to an exemplary embodiment which is illustrated in the drawing, in which FIG. 1 shows an axial section through the exemplary embodiment, FIG. 2 shows the axially outwardly facing end side of the cover, FIG. 3 shows a section through the cover along the line III-III in FIGS. 2 and 4, FIG. 4 shows the axially inwardly facing end side of the cover, FIG. 5 shows a radial section through the exemplary embodiment, and FIG. 6 shows a schematic illustration of a vehicle seat.

A vehicle seat 1 for a motor vehicle has a seat part 3 and a backrest 4, the inclination of which is adjustable relative to the seat part 3. In order to adjust the inclination of the backrest 4, a transmission rod 7, which is arranged horizontally in the transition region between the seat part 3 and backrest 4, is rotated manually, for example by means of a hand lever 5. The transmission rod 7 engages in a fitting 10 on both sides of the vehicle seat 1. The transmission rod 7 is aligned with an axis A which defines the directional details used of a cylindrical coordinate system.

The fitting 10 has a first fitting part 11 and a second fitting part 12, which are rotatable relative to each other about the axis A. The two fitting parts 11 and 12 can each be approximately inscribed into a circular disk form. The two fitting parts 11 and 12 are preferably composed of metal, in particular steel, at least regions of which may be hardened. In order to absorb the axially acting forces, i.e. in order to hold the fitting parts 11 and 12 together, a clasping ring 13 is provided. The principle of this manner of holding the fitting parts together by means of a clasping ring is described, for example, in U.S. Pat. No. 6,799,806 B2. The clasping ring 13 is preferably composed of metal, in particular steel, which is preferably unhardened.

The clasping ring 13 is fixedly connected to one of the two fitting parts 11 and 12, in the present case, for example, is welded in an outer ring section to the second fitting part 12, or is crimped (at least partially in the circumferential direction) in an alternative embodiment. By means of its radially inwardly facing edge, i.e. in the present case of an inner ring section arranged in a plane perpendicular to the axial direction, the clasping ring 13, optionally with the interposition of a separate sliding ring, which is movable relative thereto, engages over the other of the two fitting parts 11 and 12 radially outward (i.e. in the radially outer edge region thereof) without obstructing the relative rotation of the two fitting parts 11 and 12. In addition, the mutually facing inner surfaces of the two fitting parts 11 and 12 are protected against the penetration of foreign bodies and of dirt, and against damage.

The clasping ring 13 and the fitting part 11 or 12 which is connected fixedly thereto therefore clasp the other of the two fitting parts 11 and 12 which is movable relative thereto in a structural respect, the two fitting parts 11 and 12 therefore together (with the clasping ring 13) form a disk-shaped unit.

With the assembly of the fitting 10, the first fitting part 11 is, for example, connected fixedly to the structure of the backrest 4, i.e. is fixed to the backrest. The second fitting part 12 is then fixedly connected to the structure of the seat part 3, i.e. is fixed to the seat part. These assignments of the fitting parts 11 and 12 are preferred if the radial distances of the fastening points between the fitting 10 and a relatively thin backrest plate as the backrest side strut are intended to be as large as possible. However, the assignments of the fitting parts 11 and 12 may also be interchanged, i.e. the first fitting part 11 would then be fixed to the seat part and the second fitting part 12 fixed to the backrest. The fitting 10 lies in the force flux between the backrest 4 and seat part 3.

The fitting 10 is designed as a latching fitting, in which the first fitting part 11 and the second fitting part 12 are lockable to each other, as described, for example, in DE 10 2006 015 560 B3, the disclosure of which in this regard is expressly incorporated.

The second fitting part 12 has—in the present case four—guide segments 14 which, in pairs by means of rectilinear guide surfaces, each guide a bolt 16 laterally in the radial direction. The bolts 16—a total of four in the present case—are arranged offset with respect to one another—each by 90° in the present case—in a construction space defined between the two fitting parts 11 and 12. The bolts 16 are provided at the radially outer end thereof with a toothing which can enter into engagement (can engage) with a toothed ring 17 of the first fitting part 11, which is designed as an internal gear. When the toothed ring 17 and the bolts 16 interact, the fitting 10 is locked. The guide segments 14 each bear with a respectively curved bearing surface against the toothed ring 17 of the first fitting part 11, as a result of which the two fitting parts 11 and 12 are supported on each other.

A driver 21, for example made of plastic, is arranged in the center of the fitting 10, said driver, by means of a central hole 23, sitting on the transmission rod 7 for conjoint rotation—or at least for carrying the latter along—and is mounted rotatably on at least one of the two fitting parts 11 and 12, in the present case the first fitting part 11, in more precise terms in a central opening therein. An eccentric 27 sits on the driver 21 for conjoint rotation or at least for carrying the latter along, the eccentric being arranged in the construction space defined between the fitting parts 11 and 12. A spring arrangement 35, for example two spiral springs nested one in the other, is arranged in a central receptacle of one of the two fitting parts 11 and 12, in the present case the second fitting part 12, and in the present case is supported on the outside. The spring arrangement 35 acts upon the eccentric 27, in the present case by sitting on the inside on the driver 21 for conjoint rotation. The eccentric 27 which is acted upon by the spring arrangement 35 acts upon the radially movable bolts 16 such that the latter are pressed radially outward in order to engage in the toothed ring 17, and therefore the fitting 10 is locked. The toothed ring 17, the bolts 16, the eccentric 27 and the driver 21 together with the spring arrangement 35 therefore define a locking device.

A disk cam 36 is arranged axially in the construction space between the bolts 16 and the first fitting part 11 and, in the present case, sits on the eccentric 27 for conjoint rotation. The disk cam 36 has—in the present case four—control tracks which each interact with a lug 38 of each bolt 16. In this case, the jugs 38 protrude in the axial direction from the bolts 16 assigned thereto. The driver 21 is secured axially by a securing ring 43 which is fastened, preferably clipped, to the driver 21 during the assembly of the fitting 10. The driver 21 and the securing ring 43 each have a flange which bears in each case on the outside of one of the two fitting parts 11 or 12 and which acts as a seal. Upon rotation (through a few degrees) of the driver 21—and therefore of the eccentric 27, which is driven therewith, and of the disk cam 36—counter to the force of the spring arrangement 35, the disk cam 36 draws the bolt 16 radially inward, i.e. out of the toothed ring 17, and therefore the fitting 10 is unlocked and the two fitting parts 11 and 12 are rotatable relative to each other about the axis A. The inclination of the backrest. 4 can be adjusted as a result between a plurality of use positions suitable for use of the seat.

In the case of two-doored motor vehicles, the access to a rear seat row is intended to be facilitated by the backrest 4 pivoting freely, for which purpose the unlocked backrest 4 is pivoted out of one of the use positions forward into a freely pivoted position which is not suitable for use of the seat. The ease of operation is increased if the hand lever 5—or a further actuating element—does not have to be held during the entire free-pivoting operation and the fittings nevertheless lock only in the freely pivoted position. In the fitting 10, an annular free-pivoting control element 45 is provided for this purpose about the axis A between the disk cam 36 and the first fitting part 11 and is connected to the first fitting part 10 for conjoint rotation. The free-pivoting control element 48 has stop tracks which interact with the lugs 38 of the bolts 16 by limiting the movement thereof radially outward or by allowing said lugs to engage without obstruction. In order to be able to freely pivot, the backrest 4 by more than the angle between two bolts 16, the lugs 38 of the bolts 16 are arranged in an alternating manner at differing distances radially on the outside or radially on the inside of the bolts 16 assigned thereto, such that adjacent lugs 38 interact with different stop tracks. Accordingly, two different designs of the bolts 16 are provided. Details are described in DE 10 2006 015 560 B3.

According to the invention, the second fitting part 12 is not designed as a single piece but rather consists of two individual parts which are formed separately and are joined together, namely a guide part 12c and a cover 12d which are both arranged concentrically with respect to the axis Z and offset axially with respect to each other. The—preferably metallic—guide part 12c has the guide segments 14, supports the spring arrangement 35 and is connected fixedly to the clasping ring 13. The cover 12d—preferably produced from plastic—covers the spring arrangement 35 on the outside of the second fitting part 12, provides the axial contact surface for the contact of the flange of the driver 21 and optionally also supports the driver in a rotatable manner. The cover 12d bears tightly against the guide part 12c such that the fitting 10 is protected at this point against the penetration of foreign bodies and of dirt, and against damage.

The cover 12d is connected (fixedly) to the guide part 12c, in the present case by two studs 12p protruding axially from the cover 12d being inserted, preferably pressed, into corresponding receptacles, which are preferably designed as holes, of the guide part 12c.

Apart from the press fit, a clip connection is also conceivable, for example by the cover 12d engaging behind an undercut of the guide part 12c by means of spring arms. As an alternative, further known interlocking and/or integrally bonded and/or frictional connections are conceivable. The guide part 12c and cover 12d together define the central receptacle for the spring arrangement 35.

The cover 12d is of cup-shaped design, i.e. the cover has a disk-shaped base region with a central opening 12o, which is aligned with the axis A, for the driver 21 (for the mounting or merely for the passage thereof) and a cylindrical wall region which bears against the end side of the guide part 12c. The radial size of the base region is at least as large as the radial size of the spring arrangement 35 and of the central receptacle of the second fitting part 12. The axial size of the wall region is at least of a size such that an axial excess length of the spring arrangement 35 beyond the outside of the second fitting part 12 is covered. The axial size of the central receptacle of the second fitting part 12 for the spring arrangement 35 therefore corresponds to the sum of the axial size of the guide part 12c and the axial (internal) size of the wall region of the cover 12d.

LIST OF DESIGNATIONS

1 Vehicle seat
3 Seat part
4 Backrest
5 Hand lever
7 Transmission rod
10 Fitting
11 First fitting part
12 Second fitting part
12c Guide part
12d Cover
12o Opening
12p Stud
13 Clasping ring
14 Guide segment
16 Bolt
17 Toothed ring
21 Driver
23 Hole
27 Eccentric
35 Spring arrangement
36 Disk cam
38 Lug
43 Securing ring
45 Free-pivoting control element
A Axis

The invention claimed is:

1. A fitting for a vehicle seat, comprising:
a first fining part and a second fitting part, which are rotatable relative to each other about an axis, wherein a toothed ring is formed on the first fitting part and guide segments are formed on the second fitting part;
radially displaceable bolts which are guided by the guide segments of the second fitting part and the interact with the toothed ring of the first fitting part in order to lock the fitting;
a rotatably mounted eccentric which acts upon the radially displaceable bolts to cause the radially displaceable bolts to interact with the toothed ring; and
a spring arrangement which acts upon the eccentric;
wherein the second fitting part has a guide part with the guide segments, and a cover, wherein the guide part and the cover are formed separately and are connected to each other,
wherein the second fitting part includes a central receptacle for receiving the spring arrangement, wherein the central receptacle is provided by a central through-hole in the guide part and the cover, wherein the spring arrangement is disposed within the central through-hole and is covered by the cover.

2. The fitting as claimed in claim 1, wherein the guide part is formed from metal and the cover is formed from plastic.

3. The fitting as claimed in claim wherein the guide part and the cover are connected to each other by a press fit, a clip connection or another interlocking and/or frictional connection.

4. The fitting as claimed in claim 1 wherein the cover is of cup-shaped design and has an opening aligned with the axis.

5. The fitting as claimed in claim 1 wherein a rotatably mounted driver is provided, said driver being coupled to the eccentric for conjoint rotation or at least for carrying the latter along, in order to unlock the fitting, wherein the spring arrangement acts upon the eccentric directly or by the driver.

6. The fitting as claimed in claim 5, wherein the cover provides an axial contact surface for the contact of the driver.

7. The fitting as claimed in claim 5, wherein the cover supports the driver by an opening, aligned with the axis.

8. The fitting as claimed in claim 1 wherein a clasping ring holds the fitting parts together axially.

9. A vehicle seat, with a fitting as claimed in claim 1.

10. The fitting as claimed in claim 1, wherein a rotatably mounted driver is provided that extends through an opening in the cover and is rotatable about the axis, wherein the cover su orts the rotatably mounted driver.

* * * * *